J. KAMADA.
ROSIN COLLECTOR.
APPLICATION FILED FEB. 16, 1918.
1,321,051.
Patented Nov. 4, 1919.
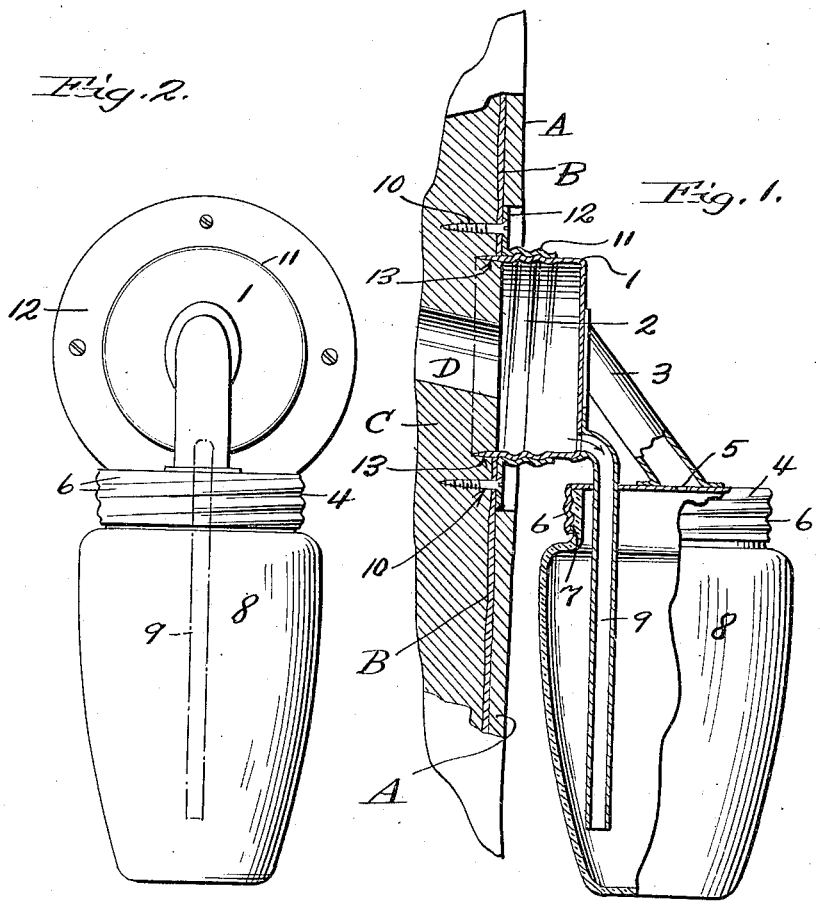
J. Kamada,
Inventor
By Geo. P. Kimmel
Attorney

UNITED STATES PATENT OFFICE.

JIROBEI KAMADA, OF TOKYO FU, JAPAN.

ROSIN-COLLECTOR.

1,321,051.		Specification of Letters Patent.		Patented Nov. 4, 1919.

Application filed February 16, 1918. Serial No. 217,730.

*To all whom it may concern:*

Be it known that I, JIROBEI KAMADA, a subject of the Emperor of Japan, and resident of 599 6-chome, Oshimacho, Minami Katsuragi Gun, Tokyo Fu, the Empire of Japan, have invented a new and useful Rosin-Collector, of which the following is a specification.

My invention relates to improvements in rosin collectors or rosin collecting apparatus which consists of fittings to be rigidly fixed to the part of a tree where the outer bark is stripped off and a secretion port is bored, a port cover to be inserted in the trunk of a tree by being twisted in the internal-screw tube of said fittings, a receptacle cover rigidly attached to said port cover, a receptacle to be screwed in said receptacle cover, and a guide tube communicating with the interior of the receptacle from said port cover, all these parts being so arranged and constructed that rosin collection is carried on completely and economically.

One object of my invention is to provide a rosin collector or rosin collecting apparatus which is capable of preventing the part of a tree where secretion takes places from contacting with outside air and keeping oil of turpentine and the like from volatilizing.

Another object of my invention is to provide a rosin collector or rosin collecting apparatus capable of keeping secretion of a tree from being hindered by shutting off outside air.

A further object of my invention is to provide a rosin collector or rosin collecting apparatus which is calculated to minimize damages of a tree incurred by the collecting operation.

Other objects and advantages to be derived from the use of my invention will appear from the following detailed description and the claims taken with an inspection of the accompanying drawing in which:

Figure 1 is a side elevational view, partly in section, of the apparatus as attached to a tree; and Fig. 2 is a front elevational view of the same.

Similar letters and numerals for reference designate like and corresponding parts throughout the several views.

1 is a port cover and an external or male screw 2 is provided at the tubular part thereof, which is connected with a receptacle cover 4 by means of a tubular brace 3; a small hole 5 is bored at the top of the receptacle cover opening into the brace 3, and an internal or female screw 7 is provided at the tubular part thereof on which a glass receptacle 8, having an external or male screw 6 at the neck, is screwed; and a guide tube 9 is attached to the port cover 1 which extends into the receptacle 8.

In operation, the outside bark or epidermis A of a tree is stripped off in a round shape as shown in Fig. 1 and the stripped part is planed, and at the center-thereof a secretion port D is bored diagonally toward the center of the tree, and fittings are rigidly fixed to the stripped part by means of screw spikes 10. The fittings consist of a circular washer 12 having a tubular part wherein an internal or female screw is provided, and when the port cover 1 is inserted into the internal screw of the fittings 11 and screwed on by rotating together with a receptacle cover 4 the flange-end of the port cover, which is preferably beveled to provide a circular penetrating cutting edge, forces its way into the inside skin B and the trunk C of the tree and stops circulation of air at the part, and then a receptacle 8 is screwed in the cover 4. The above arrangement being made, rosin flows out through the port D and runs into the receptacle 8 by passing through a port cover 1 and the guide tube 9, and when the rosin in the receptacle has reached a certain amount the receptacle is screwed off and the contents removed to another receptacle, and then said receptacle is again screwed in as before to keep on the collecting operation.

The principal features of my invention are:

That it minimizes damages of a tree owing to the fact that a hole or port is bored only at the part of a tree where secretion is needed and that the outer bark or epidermis alone is stripped off around said part.

That the hole or port can be tightly closed by inserting a wooden plug during the interval between two collecting seasons.

That it prevents secretion from being hindered by coagulation due to contact with outside air.

That the same renders it possible to collect superior rosin by preventing volatilization of oil of turpentine and the like for the reason set forth above.

That the same renders it possible to continue the collecting process even when secretion at the inner side of the port has become dull by enlarging said port nearly to the diameter of the port cover.

That it is simple in structure and cheap in cost of manufacture.

That it can be easily and speedily attached and detached at will.

Having thus fully described my invention, what I claim as new and desire to secure by Letters Patent is:

1. A rosin collector including a supporting ring, means for attaching said ring to a tree, a flanged cover threaded in said ring and provided with a circular penetrating cutting edge, a receptacle cover communicating with the flanged cover, and a receptacle removably supported by said second mentioned cover.

2. A rosin collector including a supporting ring, means for attaching said ring to a tree, a flanged cover threaded in said ring provided with a circular penetrating cutting edge, a receptacle cover, a hollow brace connecting the flanged cover with the receptacle cover and supporting the latter, and a receptacle removably supported by the second mentioned cover.

3. A rosin collector including a supporting ring, means for attaching said ring to a tree, a flanged cover carried in said ring and provided with a circular penetrating edge, a receptacle cover, a hollow brace connecting the flanged cover with the receptacle cover, a receptacle removably supported by the second mentioned cover, and a rosin conducting tube communicating with the flanged cover and extending into the receptacle.

In testimony whereof I affix my signature hereto.

JIROBEI KAMADA. [L. S.]

Copies of this patent may be obtained for five cents each, by addressing the "Commissioner of Patents, Washington, D. C."